United States Patent
Choi

(10) Patent No.: US 12,001,631 B2
(45) Date of Patent: Jun. 4, 2024

(54) TOUCH SENSING DEVICE AND TOUCH SENSING METHOD

(71) Applicant: LX Semicon Co., Ltd., Daejeon (KR)

(72) Inventor: Ho Sup Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 65 days.

(21) Appl. No.: 17/959,031

(22) Filed: Oct. 3, 2022

(65) Prior Publication Data
US 2023/0176686 A1 Jun. 8, 2023

(30) Foreign Application Priority Data
Dec. 3, 2021 (KR) .......................... 10-2021-0171819

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
CPC .... G06F 3/0446; G06F 3/0443; G06F 3/0442; G06F 3/044; G06F 3/041661; G06F 3/04166; G06F 3/04162; G06F 3/0412; G06F 3/04182
See application file for complete search history.

(56) References Cited

U.S. PATENT DOCUMENTS

| | | | | |
|---|---|---|---|---|
| 2012/0013555 A1* | 1/2012 | Maeda | ................... | G06F 3/0446 345/173 |
| 2015/0103039 A1* | 4/2015 | Cho | ..................... | G06F 3/03545 345/174 |
| 2018/0113559 A1* | 4/2018 | Bae | ....................... | G06F 3/03545 |
| 2018/0188836 A1* | 7/2018 | Park | ..................... | G06F 3/03545 |
| 2019/0004649 A1* | 1/2019 | Ju | .......................... | G06F 3/0446 |
| 2019/0196644 A1* | 6/2019 | Chung | .................. | G06F 3/0442 |
| 2021/0200404 A1* | 7/2021 | Kim | ...................... | G06F 3/0412 |

FOREIGN PATENT DOCUMENTS

KR 10-1903415 B1 10/2018
KR 2021-0082748 A 7/2021

\* cited by examiner

*Primary Examiner* — Hong Zhou
(74) *Attorney, Agent, or Firm* — ROTHWELL, FIGG, ERNST & MANBECK, P.C.

(57) ABSTRACT

Embodiments relate to a technology of sensing a position of a pen in a touch panel in which a plurality of touch electrodes are disposed. In order to reduce the noise of data when sensing the position of a pen, a method of calculating a position by using data of all data slots for a region preset on the basis of a previous position of the pen.

15 Claims, 7 Drawing Sheets

TOUCH SENSING DEVICE AND TOUCH SENSING METHOD

CROSS REFERENCE TO RELATED APPLICATION

This application claims priority to Republic of Korea Patent Application No. 10-2021-0171819 filed on Dec. 3, 2021, which is hereby incorporated by reference in its entirety.

BACKGROUND

1. Field of Technology

The present disclosure relates to a pen position sensing device and a pen position sensing method for sensing a touch position of a pen by electrodes disposed in a touch panel.

2. Related Technology

Recently, a touch function has been widely adopted in display panels from a small electronic device (e.g., a smartphone) to a large electronic device (e.g., a TV or an electronic board). In this case, most display panels are implemented by flat panel display devices such as liquid crystal displays, and the touch function is implemented by a touch panel which is combined with a display panel.

The touch panel means a transparent switch panel which has a function of operating a device or executing a program as a user touches a text, an image or an icon. The touch panel may be configured to perform touch recognition in a capacitive manner, and as an example of a touch panel which implements capacitive touch recognition, "Mutual capacitance touch sensing device" is disclosed in U.S. Patent Application Publication No. 2009/0091551. A general touch panel has a structure which is independent of a display panel, and is separately fabricated to be combined with the display panel.

In a touch panel, touch electrodes (TE) (or electrodes: EL) of a predetermined size, for example, touch electrodes having a predetermined size depending on the size of a display device or the size of the touch panel, may be disposed in the form of an N*M matrix. When a touch is made by a certain object (e.g., a hand or an electronic pen) to a plurality of touch electrodes disposed in the touch panel, each touch electrode may sense the touch of the object. A touch sensing device may determine a position (or touch coordinates) where the touch by the object is made, through the position of a touch electrode at which the touch of the object is sensed.

However, when sensing a position of a pen, since a position of the pen is sensed using not all data slots due to a lack of computation time, a problem may be caused in that an inaccurate position sensing result may be outputted upon noise generation.

The discussions in this section are only to provide background information and does not constitute an admission of prior art.

SUMMARY

Various embodiments are directed to a pen position sensing device and a pen position sensing method capable of accurately sensing a position of a pen even within a limited computation time when sensing a touch of the pen.

In an embodiment, a touch sensing device may include: a touch sensing circuit configured to identify touch coordinates on the basis of sensing values for a plurality of touch electrodes disposed in a panel, wherein, when a driving signal comprising a base slot and a plurality of data slots, is supplied to the plurality of touch electrodes, the touch sensing circuit determines a temporary position of a pen on the basis of data included in the base slot of the driving signal and acquires data values for the base slot and the plurality of data slots with respect to each of the touch electrodes in a region of interest including the determined temporary position of the pen.

The plurality of touch electrodes may be disposed in a form of an N*M (N and M are natural numbers) matrix, and N touch electrodes in a vertical direction may be connected to a same multiplexer.

The touch sensing circuit may set, as the region of interest, touch electrodes within a preset distance in a left horizontal direction and within a preset distance in a right horizontal direction on the basis of a touch electrode corresponding to the determined temporary position of the pen and other touch electrodes connected to the same multiplexer with the touch electrodes in a same horizontal direction.

In another embodiment, a touch sensing method may include: supplying a driving signal comprising a base slot and a plurality of data slots to a panel in which a plurality of touch electrodes are disposed; determining a position of a pen on the basis of data included in the base slot of the driving signal; and setting a region of interest including the determined position of the pen, and acquiring data values for the base slot and the plurality of data slots with respect to each of touch electrodes in the region of interest.

In still another embodiment, a touch sensing device may include: a touch sensing circuit configured to identify touch coordinates on the basis of sensing values for a plurality of touch electrodes which are disposed in a first direction and a second direction, which is perpendicular to the first direction, wherein, when a driving signal comprising a base slot and a plurality of data slots, is supplied to the plurality of touch electrodes, the touch sensing circuit determines a position of a pen on the basis of data included in the base slot of the driving signal and updates a position of the pen by acquiring data values for the base slot and the plurality of data slots with respect to each of touch electrodes in a region of interest including the determined position of the pen.

As described above, according to the embodiments of the present disclosure, it is possible to provide a touch sensing device capable of minimizing noise for a touch position of a pen within a given computation time.

DETAILED DESCRIPTION OF EMBODIMENTS

Figure 1:
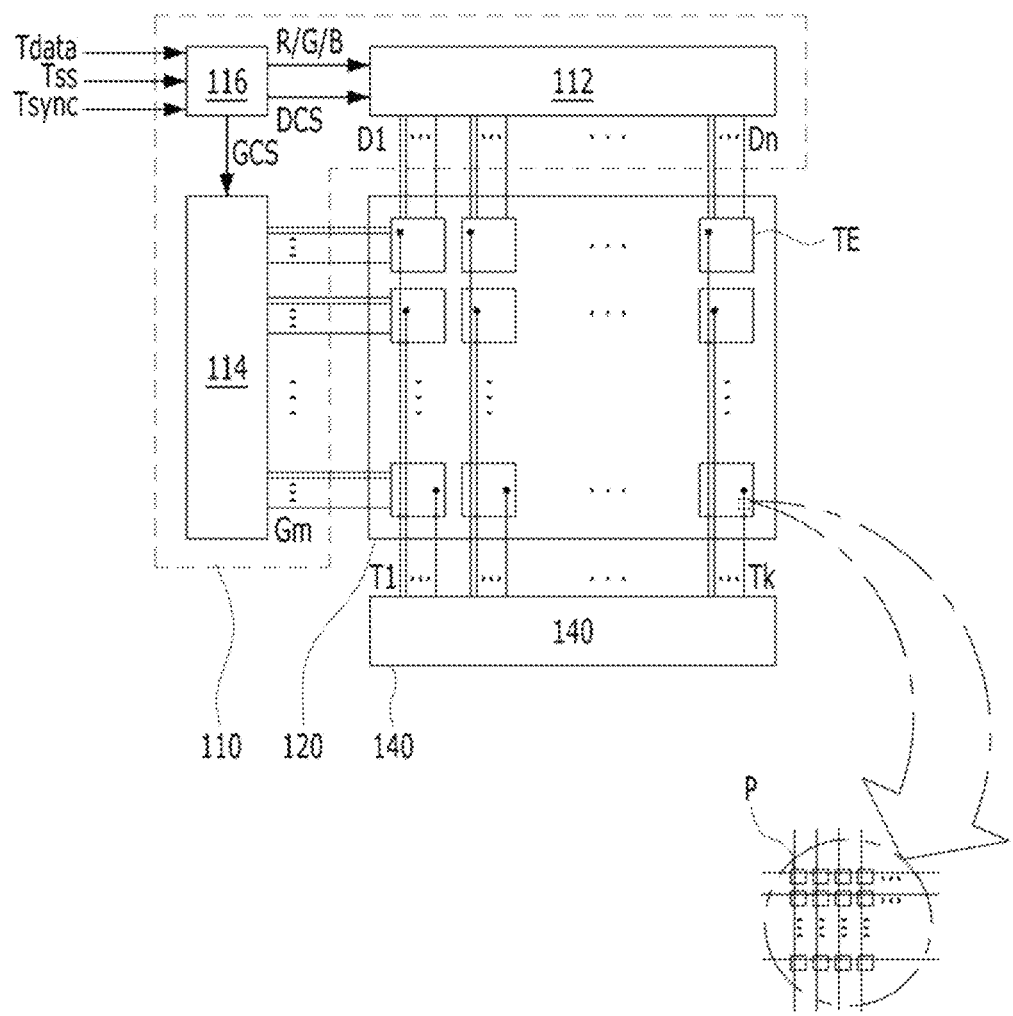
FIG. 1 is a configuration diagram of a display device including a touch sensing device in accordance with an embodiment.

FIG. 1 is a configuration diagram of a display device including a touch sensing device in accordance with an embodiment of the present disclosure. As shown in FIG. 1, the display device in accordance with the embodiment of the present disclosure performs a display function and a touch sensing function, and may be implemented by a flat panel display such as a liquid crystal display (LCD) or an organic light emitting diode (OLED). Although embodiments to be described below exemplify an LCD, the present disclosure is not limited thereto and may be equally or similarly applied to a display based on an LED or an OLED.

In an embodiment, the display device according to the present disclosure may include a capacitance type touch screen integrally implemented therein to sense a touch by the contact of a conductive object such as a finger or an active pen. Such a touch screen may be configured in a form independent of a display panel for implementing a display, or may be built in the pixel array of a display panel.

As shown in FIG. 1, the display device in accordance with the embodiment of the present disclosure includes a panel driving device 110, a panel (e.g., a display panel or a touch panel) 120 and a touch sensing circuit (or touch sensing circuitry) 140.

The panel 120 displays an image of a predetermined grayscale or receives a touch input by a hand (or a finger) or an active pen (or an electronic pen). The panel 120 may be a display panel which has an in-cell touch type structure using a capacitance type. In an embodiment, the panel 120 may be an in-cell touch type display panel using a self capacitance type or an in-cell touch type display panel using a mutual capacitance type. Hereinafter, for the sake of convenience in explanation, description will be made on the assumption that the panel 120 is an in-cell touch type display panel using a self capacitance type.

The panel 120 may operate in a display mode and a touch sensing mode.

In FIG. 1, the panel 120 may display an image using light radiated from a backlight unit during the display mode, and may serve as a touch panel for sensing a touch during the touch sensing mode.

The panel driving device 110 may include a data driving circuit 112, a gate driving circuit 114 and a timing controller 116. Each of the data driving circuit 112, the gate driving circuit 114 and the touch sensing circuit 140 may drive at least one component included in the panel 120.

The data driving circuit 112 may drive data lines DL (e.g., D1 to Dn) which are connected to pixels P, and the gate driving circuit 114 may drive gate lines GL (e.g., G1 to Gm) which are connected to the pixels P. The touch sensing circuit 140 may drive electrodes (EL) or touch electrodes (TE) which are disposed in the panel 120.

The data driving circuit 112 may supply data voltages to the data lines DL to display an image on the respective pixels P of the panel 120. The data driving circuit 112 may include at least one data driving circuit integrated circuit. The at least one data driving circuit integrated circuit may be connected to bonding pads of the panel 120 through a tape automated bonding (TAB) method or a chip on glass (COG) method, or may be directly formed in the panel 120. As the case may be, the at least one data driving circuit integrated circuit may be formed by being integrated in the panel 120. Furthermore, the data driving circuit 112 may be implemented through a chip on film (COF) method.

The gate driving circuit 114 may supply scan signals to the gate lines GL to turn on or off transistors which are located in the respective pixels P. Depending on a driving method, the gate driving circuit 114 may be located on only one side of the panel 120 as illustrated in FIG. 1 or may be divided into two to be located on both sides of the panel 120. Furthermore, the gate driving circuit 114 may include at least one gate driving circuit integrated circuit. The at least one gate driving circuit integrated circuit may be connected to the bonding pads of the panel 120 through a TAB method or a COG method or may be implemented in a gate in panel (GIP) type to be directly formed in the panel 120. As the case may be, the at least one gate driving circuit integrated circuit may be formed by being integrated in the panel 120. Furthermore, the gate driving circuit 114 may be implemented through a COF method.

The panel 120 may include only a touch panel (a touch screen panel: TSP) or may further include a display panel. The touch panel and the display panel may share some components with each other. For example, a touch electrode TE for sensing a touch in the touch panel may be used as a common voltage electrode to which a common voltage is supplied in the display panel. From the point of view in which some components of the display panel and the touch panel are shared, such a panel 120 is called an integrated panel, but the present disclosure is not limited thereto. Furthermore, an in-cell type panel is known as a type in which the display panel and the touch panel are integrally coupled. However, the in-cell type panel is nothing but a mere example of the panel 120, and a panel to which the present disclosure is applied is not limited to such an in-cell type panel.

A plurality of touch electrodes TE may be disposed in the panel 120, and the touch sensing circuit 140 may drive the touch electrodes TE using driving signals. The touch sensing circuit 140 may generate a sensing value for the touch electrode TE according to a reaction signal generated in the touch electrode TE in response to the driving signal. The touch sensing circuit 140 may calculate touch coordinates by using sensing values for the plurality of touch electrodes TE disposed in the panel 120, and the calculated touch coordinates may used by being transmitted to another device (e.g., a host, a controller or a processor).

Figure 2:
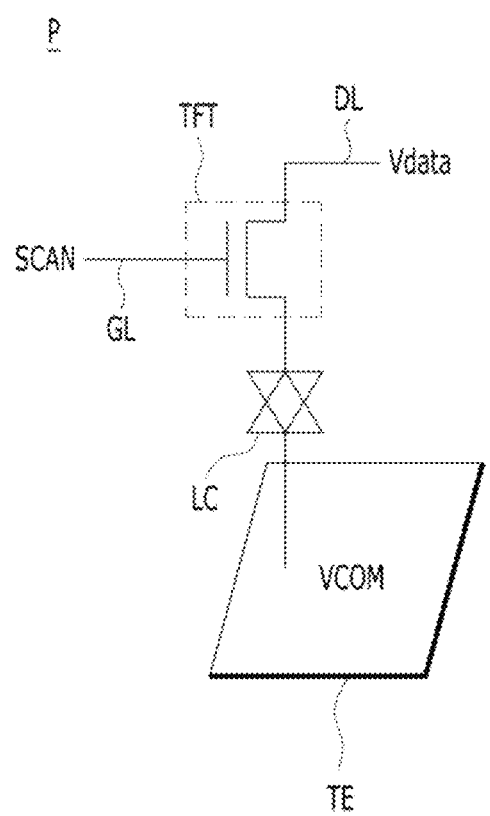
FIG. 2 is a diagram illustrating the internal configuration of a pixel when a touch electrode in accordance with an embodiment is used as a common voltage electrode.

FIG. 2 is a diagram illustrating the internal configuration of a pixel when a touch electrode in accordance with an embodiment is used as a common voltage electrode. Referring to FIG. 2, the pixel P may include a transistor (e.g., TFT), a liquid crystal LC and a common voltage electrode VCOM. A gate terminal of the transistor TFT may be connected to the gate line GL, a drain terminal of the transistor TFT may be connected to the data line DL, and a source terminal of the transistor TFT may be connected to the liquid crystal LC.

When a scan signal SCAN corresponding to a turn-on voltage is supplied to the gate terminal through the gate line GL, the drain terminal and the source terminal of the transistor TFT may be connected, and a data voltage Vdata may be supplied to the liquid crystal LC. A common voltage may be supplied to the common voltage electrode VCOM, and, as the liquid crystal LC is controlled according to a difference between the common voltage and the data voltage Vdata, the brightness of the pixel P is may be adjusted.

The common voltage electrode VCOM may be the same electrode as the touch electrode TE which is driven by the touch sensing circuit 140 (see FIG. 1) as described above with reference to FIG. 1. However, this is nothing but a mere example, and embodiments of the present disclosure are not limited thereto.

Figure 3:
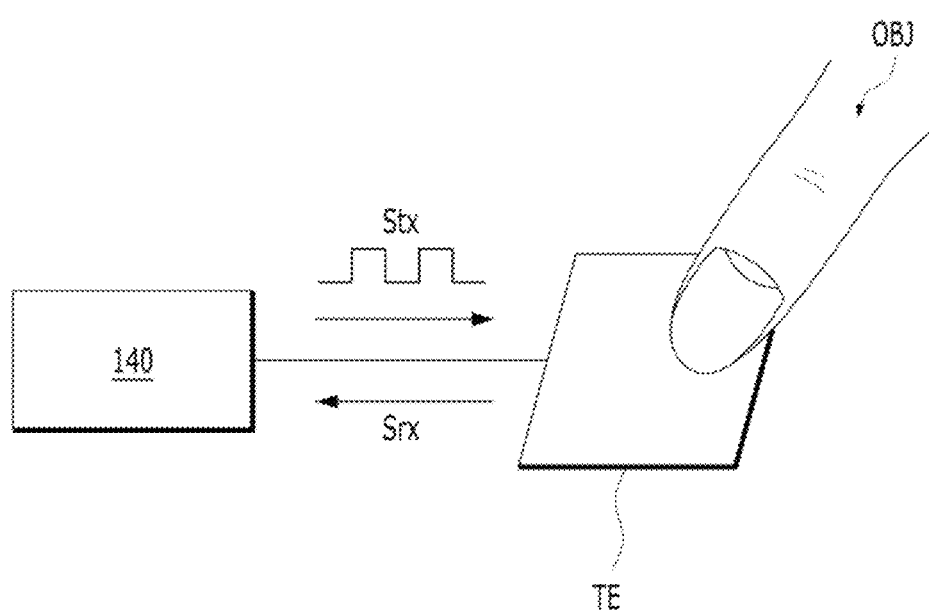
FIG. 3 is a diagram illustrating driving of a touch electrode by a touch sensing circuit in accordance with an embodiment.

FIG. 3 is a diagram illustrating driving of a touch electrode by a touch sensing circuit in accordance with an embodiment. Referring to FIG. 3, the touch sensing circuit 140 may drive the touch electrode TE using a driving signal Stx, and may sense a touch or proximity of an external object OBJ to a panel according to a reaction signal Srx generated in the touch electrode TE in response to the driving signal Stx.

The touch sensing circuit 140 may adopt a capacitive touch scheme for recognizing a proximity or touch of the object OBJ by sensing the capacitance of or a change in the capacitance of the touch electrode TE.

The capacitive touch scheme may be divided into, for example, a mutual capacitance type touch scheme and a self capacitance type touch scheme. In the mutual capacitance type touch scheme as a kind of the capacitive touch scheme, a touch driving signal Stx is applied to one touch electrode, and the other touch electrode which is coupled with the one touch electrode is sensed. In the mutual capacitance type touch scheme, a value sensed by the other touch electrode varies according to a touch or proximity of the object OBJ such as a finger or a pen. In the mutual capacitance type touch scheme, a touch, touch coordinates, etc. are detected by using such a sensing value.

In the self capacitance type touch scheme as another kind of the capacitive touch scheme, a touch driving signal Stx is applied to one touch electrode, and then, the corresponding one touch electrode is sensed again. In the self capacitance type touch scheme, a value sensed by the corresponding one touch electrode varies according to a touch or proximity of the object OBJ such as a finger or a pen. In the self capacitance type touch scheme, a touch, touch coordinates, etc. are detected by using such a sensing value. In the self capacitance type touch scheme, a touch electrode for applying the touch driving signal Stx and a touch electrode for sensing a touch or proximity are the same.

An embodiment may be applied to the mutual capacitance type touch scheme, and may also be applied to the self capacitance type touch scheme. In some examples below, for the sake of convenience in explanation, a case in which an embodiment is applied to the self capacitance type touch scheme will be described.

As shown in FIG. 1, touch electrodes TE which are disposed in the panel 120 may be arranged in the form of a matrix. In the arrangement in the form of a matrix, the touch electrodes TE may be disposed in a predetermined size and at regular intervals according to respective rows and columns. For example, when touch electrodes TE are disposed in four rows and four columns, a total of 16 touch electrodes TE may be disposed.

Figure 4:
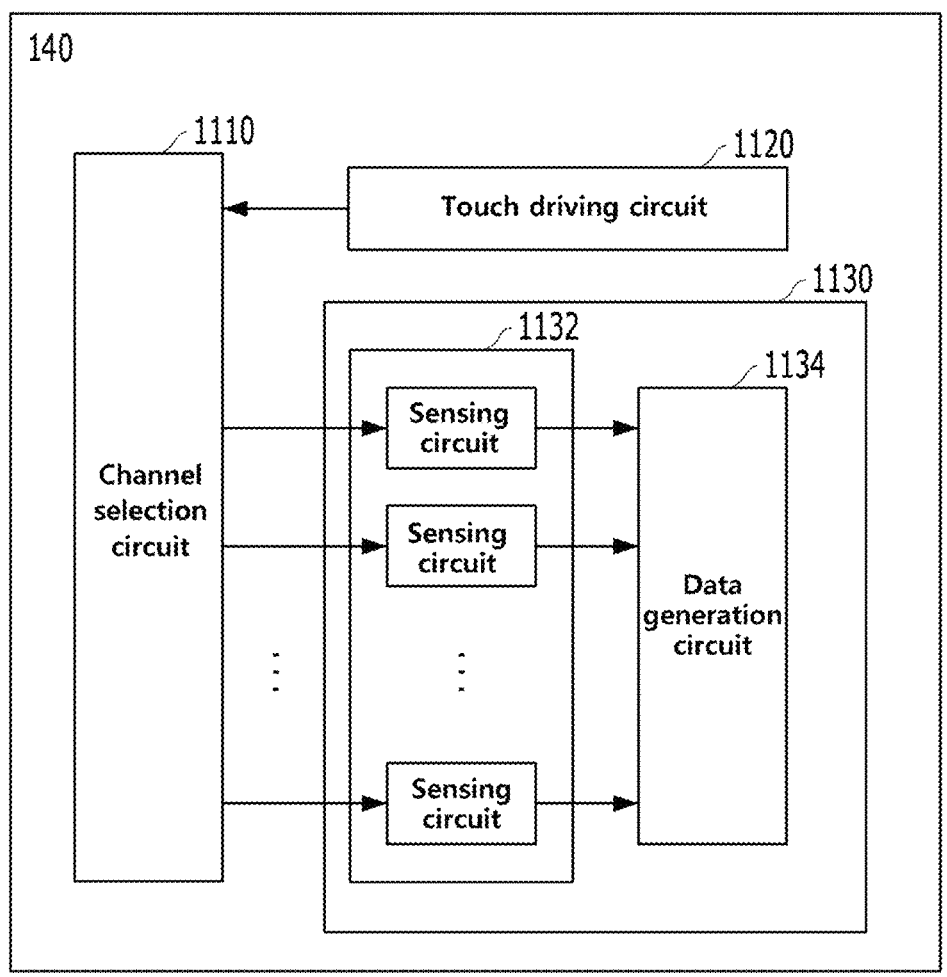
FIG. 4 is a configuration diagram of a touch sensing circuit in accordance with an embodiment.

FIG. 4 is a configuration diagram of a touch sensing circuit in accordance with an embodiment. Referring to FIG. 4, the touch sensing circuit 140 includes a channel selection circuit 1110, a touch driving circuit 1120 and a data processor 1130. The channel selection circuit 1110 is connected to the plurality of touch electrodes TE through a plurality of touch lines T1 to Tk.

The channel selection circuit 1110 supplies an uplink signal, supplied from the touch driving circuit 1120, to the touch electrodes TE during a first touch sensing period TT1, and supplies a touch driving signal, supplied from the touch driving circuit 1120, to the touch electrodes TE during a third touch sensing period TT3.

In order to sense a capacitance generated by an active pen touch or a finger touch, the channel selection circuit 1110 connects the touch lines T1 to Tk to the data processor 1130 during a second touch sensing period TT2 and the third touch sensing period TT3. To this end, the channel selection circuit 1110 may include a plurality of multiplexers (not shown) which are switched according to a touch synchronization signal Tsync and a channel select signal CSS to selectively connect the plurality of touch lines T1 to Tk to the data processor 1130. For example, eight touch lines may be bundled in common to one multiplexer.

For instance, when assuming that eight touch electrodes TE positioned in the same column are connected to one multiplexer, a first-first touch line T(1-1) may connect eight touch electrodes TE positioned in a first row to an eighth row positioned in a first column, a first-second touch line T(1-2) may connect eight touch electrodes TE positioned in the first row to the eighth row positioned in a second column, and a first-mth touch line T(1-m) may connect eight touch electrodes TE positioned in the first row to the eighth row positioned in an mth column.

Similarly, a second-first touch line T(2-1) may connect eight touch electrodes TE positioned in a ninth row to a sixteenth row positioned in the first column, a second-second touch line T(2-2) may connect eight touch electrodes TE positioned in the ninth row to the sixteenth row positioned in the second column, and a second-mth touch line T(2-m) may connect eight touch electrodes TE positioned in the ninth row to the sixteenth row positioned in the mth column.

That is to say, an nth-mth touch line T(n-m) may connect eight touch electrodes TE positioned in an (8*n)th row to an (8*n+7)th row positioned in the mth column.

The channel selection circuit 1110 may supply a common voltage Vcom to the plurality of touch electrodes TE through the plurality of touch lines T1 to Tk during display periods DP1 to DPn of the touch synchronization signal Tsync. The touch driving circuit 1120 generates the uplink signal or the touch driving signal, and supplies the generated uplink signal or touch driving signal to the touch electrodes TE through the respective touch lines T1 to Tk connected to the channel selection circuit 1110. In detail, the touch driving circuit 1120 generates the uplink signal during the first touch sensing period TT1 of one frame period and supplies the uplink signal to the touch electrodes TE through the respective touch lines T1 to Tk, and generates the touch driving signal during a plurality of second touch sensing periods TT2 and a plurality of third touch sensing periods TT3 of one frame period and supplies the touch driving signal to the touch electrodes TE through the respective touch lines T1 to Tk. The uplink signal may include the panel information of the panel 120, a protocol version, a synchronization signal or the like.

In an embodiment, the touch driving circuit 1120 may generate the uplink signal or the touch driving signal by using a driving signal having a plurality of driving pulses which swing between a high voltage and a low voltage on the basis of a reference common voltage. The touch driving circuit 1120 may supply the common voltage Vcom to the plurality of touch electrodes TE through the plurality of touch lines T1 to Tk during the display periods DP1 to DPn of the touch synchronization signal Tsync. In FIG. 4, it has been described that the touch driving circuit 1120 directly inputs the uplink signal or the touch driving signal to the channel selection circuit 1110. However, in a modified embodiment, the touch driving circuit 1120 may input the uplink signal or the touch driving signal to the channel selection circuit 1110 through the data processor 1130.

The data processor 1130 senses a pen touch during the second touch sensing period TT2 and senses a finger touch during the third touch sensing period TT3 to generate second sensing data, and determines coordinates by the pen touch or the finger touch using the generated second sensing data.

In order to implement the above-described function, the data processor 1130 according to the present disclosure includes a plurality of sensing circuits 1132 and a data generation circuit 1134 as shown in FIG. 4.

Accordingly, the touch sensing circuit 140 may check touch coordinates or whether a touch has been made or not, by sensing a pen touch and a finger touch during the second and third touch sensing periods TT2 and TT3.

Figure 5:
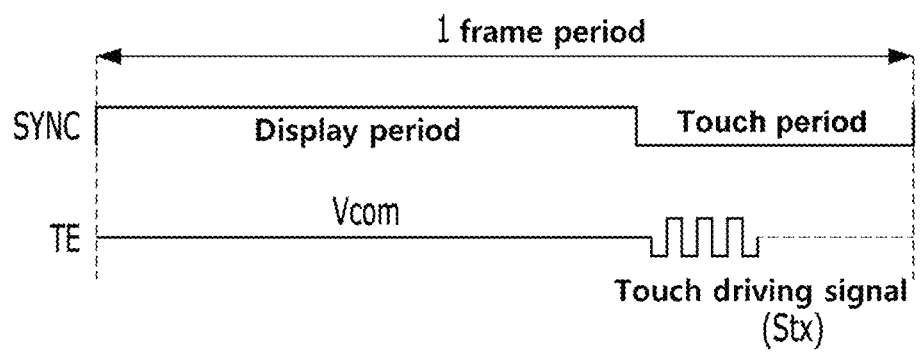
FIG. 5 is an operation timing diagram of a touch sensing device in accordance with an embodiment.
Figure 6:
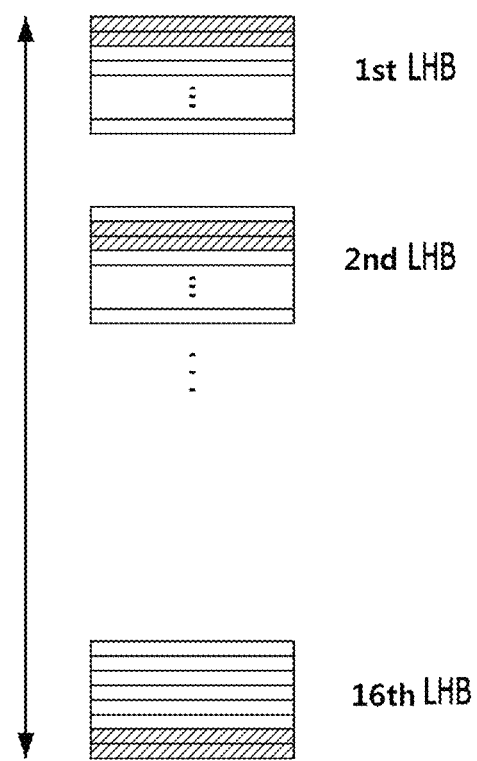
FIG. 6 is a diagram showing a concept that a plurality of display periods and a plurality of touch periods proceed during one frame period according to an LHB (long horizontal blank) driving scheme of a touch sensing device in accordance with an embodiment.

FIG. 5 is an operation timing diagram of a touch sensing device in accordance with an embodiment, and FIG. 6 is a diagram showing a concept that a plurality of display periods and a plurality of touch periods proceed during one frame period according to an LHB (long horizontal blank) driving scheme of a touch sensing device in accordance with an embodiment.

In the touch sensing device, one frame period is divided into at least one display period and at least one touch period. The display period and the touch period may be defined by a synchronization signal SYNC.

For example, the common voltage Vcom is applied to the plurality of touch electrodes TE through the plurality of touch lines T1 to Tk during the display period, and the touch driving signal Stx is applied during the touch period.

FIG. 6 is a diagram showing a concept that a plurality of display periods (16 display periods) and a plurality of touch periods (16 touch periods) proceed during one frame period according to an LHB (long horizontal blank) driving scheme of a touch sensing device in accordance with an embodiment.

In one frame period, an entire display region is displayed once. However, during the one frame period, touch sensing for the entire region of a screen may be performed not once but a plurality of times. The conceptual diagram shown in FIG. 6 is a conceptual diagram showing that, during one frame period, a display period proceeds once and touch sensing also proceeds once for the entire region of a screen.

For example, when one frame period has one display period and one touch period, during one frame period, display driving during a first display period and touch driving during a first touch period may be sequentially performed.

Unlike this, although not shown, when one frame period is divided into two display periods and two touch periods, during one frame period, display driving during a first display period, touch driving during a first touch period, display driving during a second display period and touch driving during a second touch period may be sequentially performed.

One frame period may include 16 display periods D during which display driving is performed and 16 blank periods (hereinafter, long horizontal blank periods (LHBs)) during which display driving is not performed. The 16 LHBs are sequentially denoted as a first LHB to a sixteenth LHB. In other words, during the first LHB to the sixteenth LHB, the touch driving signal Stx may be applied to perform touch sensing, and the reaction signal Srx responsive to the applied touch driving signal Stx may be received from the touch electrodes TE.

Accordingly, the first LHB shown in FIG. 6 means the long horizontal blank period between a first display period and a second display period, and the second LHB means the long horizontal blank period between the second display period and a third display period.

Figure 7:
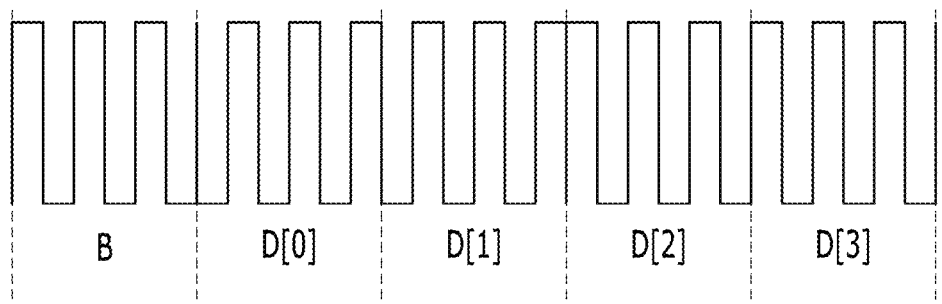
FIG. 7 is a diagram illustrating pulses of a driving signal for touch sensing.
Figure 8:
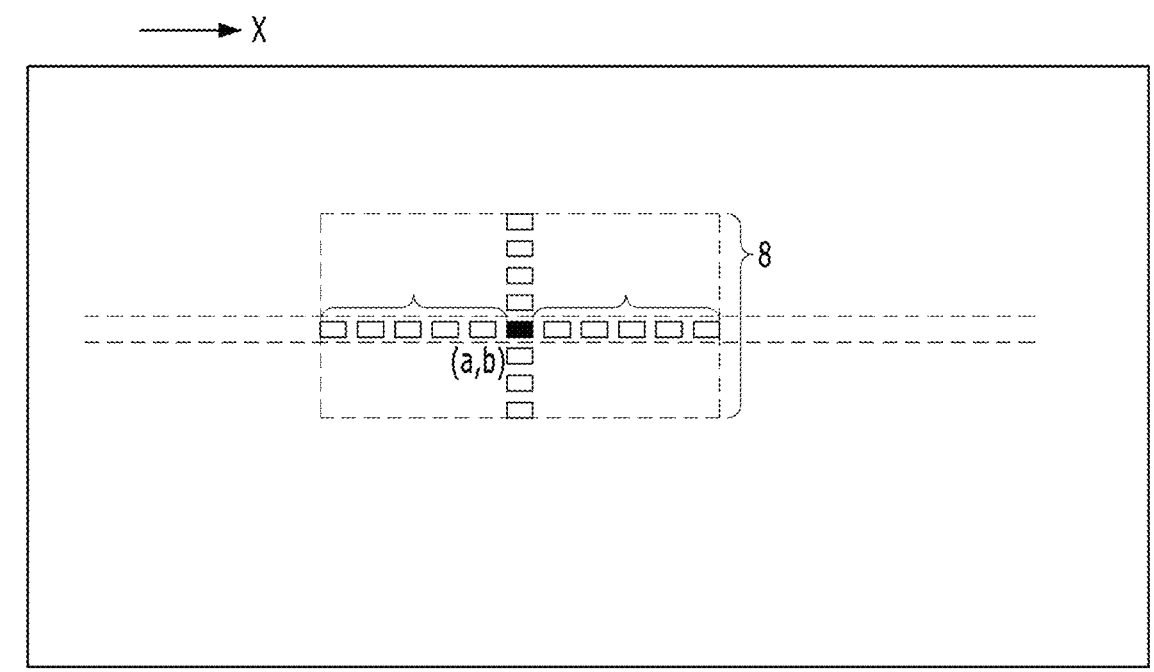
FIG. 8 is a schematic diagram illustrating a region where a touch position of a pen is sensed at a specific time point on a touch panel.

Hereinafter, a method for minimizing pen touch noise during the 1LHB according to an embodiment will be described. FIG. 7 is a diagram illustrating pulses of a signal for touch sensing, and FIG. 8 illustrates a reference region of interest for sensing the position of a pen on a touch panel.

Referring to FIG. 7, for example, a touch driving signal for touch sensing during the 1LHB may include base B, data D[0], data D[1], data D[2] and data D[3] slots. In the conventional art, when all of the base B, data D[0], data D[1], data D[2] and data D[3] slots of the touch driving signal for touch sensing are used in order to improve the noise of data, a computation time is insufficient. Thus, the position of a pen is searched for on the basis of only the signal of the base (B) slot.

According to an embodiment, the position of a pen is searched for by using only the base B slot, and data is calculated using all of the base B, data D[0], data D[1], data D[2] and data D[3] slots within a region designated on the basis of the searched position of the pen, whereby it is possible to minimize noise.

For example, when assuming that eight touch electrodes TE positioned in the same column are connected to one multiplexer, since the position of a pen is searched for by using only the data of a base slot among five slots, row data are acquired by nodes corresponding to 8*(the number of columns).

Thereafter, a region of interest (ROI) is designated on the basis of the acquired position of the pen. The region of interest may be a rectangular region composed of N (N is a natural number) nodes in a first direction and M (M is a natural number) nodes in a second direction perpendicular to the first direction around a touch electrode corresponding to the determined position of the pen.

For example, FIG. 8 illustrates that data are acquired using all five slots for five left nodes and five right nodes in an X direction and eight nodes bundled to one channel in a Y direction on the basis of an acquired position of a pen. In detail, when node coordinates of an acquired position of a pen are (a,b), row data may be acquired using all five slots within the nodes of a rectangular region of interest including 11 horizontal axis nodes (a−5,b) to (a+5,b) on the basis of the (a,b) node in the X direction and eight nodes bundled to the same channel as the (a,b) node in the Y direction.

In other words, even though the region of nodes to acquire data is limited, since the data values of all data slots (the base (B), data D[0], data D[1], data D[2] and data D[3] slots) are acquired, it is possible to minimize the noise of row data.

Then, after obtaining absolute values of the acquired data values of all the data slots, an average value is calculated.

Figure 9:
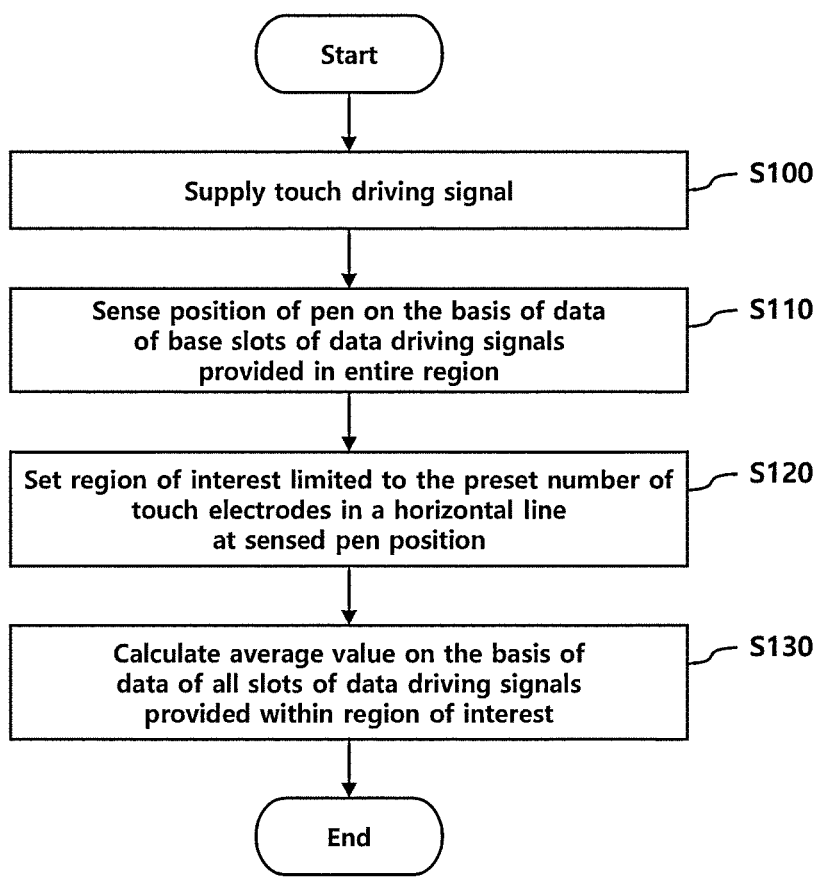
FIG. 9 is a flowchart showing a touch sensing method in accordance with an embodiment.

FIG. 9 is a flowchart showing a touch sensing method in accordance with an embodiment. First, the touch sensing device supplies a touch driving signal to the touch electrodes TE (S100). A period during which the touch driving signal is supplied to the touch electrodes TE is not a display period but a blank period, and may be 16 blank periods (hereinafter, long horizontal blank periods (LHBs)) during which touch sensing is performed. In other words, during a first LHB to a sixteenth LHB, the touch driving signal Stx may be applied to perform touch sensing, and the reaction signal Srx responsive to the applied touch driving signal Stx may be received from the touch electrodes TE.

The position of a pen is sensed on the basis of only data included in a base slot among the base slot and a plurality of data slots included in the supplied touch driving signal (S110). This is because, when data included in both the base slot and the plurality of data slots are used, touch processing during a blank period may malfunction due to a large amount of computation. Therefore, in order to minimize an amount of computation, the position of a pen is sensed using only the base slot. Here, an entire region means touch electrodes corresponding to the product of the number of vertical touch electrodes bundled to the same channel (the same touch driving line) as a base slot and the total number of horizontal touch electrodes.

When the position of the pen is sensed at the step S110, a region of interest limited to a preset number of horizontal touch electrodes at the sensed position of the pen is set (S120). Namely, the limited region of interest means a region composed of a plurality of vertical pattern electrodes (1<n<N) connected to the same touch driving line as a touch electrode including the coordinates of the determined position of the pen and horizontal pattern electrodes included within a left horizontal distance and a right horizontal distance preset on the basis of the touch electrode including the coordinates of the determined position of the pen. Accordingly, the region of interest includes a plurality of touch electrodes (the number of which is n*(2m+1)) composed of a plurality of vertical pattern electrodes (the number of which is n) connected to the same touch driving line as the touch electrode including the coordinates (a,b) of the determined position of the pen and horizontal pattern electrodes (the number of which is 2m+1) included between coordinates (a−m,b) of a touch electrode positioned at a left horizontal distance preset on the basis of the coordinates (a,b) of the determined position of the pen and coordinates (a+m,b) of a touch electrode positioned at a right horizontal distance preset on the basis of the coordinates (a,b) of the determined position of the pen.

Thereafter, by receiving data for all slots (including the base slot and the plurality of data slots) with respect to each touch electrode within the set region of interest, an absolute value is taken and an average value is calculated (130).

As is apparent from the above description, since an average value is calculated by securing data of all slots for a limited region of interest, it is possible to minimize the noise of sensing the position of a pen within a given computation time by reducing the region of interest in spite of extending a sensing time.

A touch sensing device which performs the above-described method may update the position of the pen according to a data value acquired from the region of interest.

What is claimed is:

1. A touch sensing device comprising:
   a touch sensing circuit configured to identify touch coordinates on the basis of sensing values for a plurality of touch electrodes disposed in a panel,
   wherein, when a driving signal comprising a base slot and a plurality of data slots, is supplied to the plurality of touch electrodes, the touch sensing circuit determines a temporary position of a pen on the basis of data included in the base slot of the driving signal and acquires data values for the base slot and the plurality of data slots with respect to each of the touch electrodes in a region of interest including the determined temporary position of the pen.

2. The touch sensing device according to claim 1, wherein the plurality of touch electrodes are disposed in a form of an N*M (N and M are natural numbers) matrix and N touch electrodes in a vertical direction are connected to a same multiplexer.

3. The touch sensing device according to claim 2, wherein the touch sensing circuit sets, as the region of interest, touch electrodes within a preset distance in a left horizontal direction and within a preset distance in a right horizontal direction on the basis of a touch electrode corresponding to the determined temporary position of the pen and other touch electrodes connected to the same multiplexer with the touch electrodes in a same horizontal direction.

4. The touch sensing device according to claim 1, wherein the touch sensing circuit is supplied with the driving signal during a plurality of long horizontal blank periods (LHBs) included in one frame period.

5. The touch sensing device according to claim 1, wherein the touch sensing circuit obtains absolute values of data values acquired for the base slot and the plurality of data slots with respect to each of the touch electrodes included in the region of interest, and then, calculates an average value.

6. The touch sensing device according to claim 1, wherein the plurality of touch electrodes are common electrodes.

7. A touch sensing method comprising:
   supplying a driving signal comprising a base slot and a plurality of data slots, to a panel in which a plurality of touch electrodes are disposed;
   determining a position of a pen on the basis of data included in the base slot of the driving signal; and
   setting a region of interest including the determined position of the pen and acquiring data values for the base slot and the plurality of data slots with respect to each of touch electrodes in the region of interest.

8. The touch sensing method according to claim 7, further comprising:
   updating a position of the pen based on the data values acquired in the region of interest.

9. The touch sensing method according to claim 7, wherein the driving signal comprises one base slot and four data slots.

10. The touch sensing method according to claim 7, wherein the plurality of touch electrodes are disposed in a form of an N*M (N and M are natural numbers) matrix and N touch electrodes in a vertical direction are connected to a same multiplexer.

11. The touch sensing method according to claim 10, wherein the region of interest comprises touch electrodes included within a preset distance in a left horizontal direction and within a preset distance in a right horizontal direction on the basis of a touch electrode corresponding to the determined position of the pen and other touch electrodes connected to the same multiplexer with the touch electrodes in a same horizontal direction.

12. The touch sensing method according to claim 7, wherein the driving signal is supplied during 16 long horizontal blank periods (LHBs) included in one frame period.

13. The touch sensing method according to claim 7, further comprising:
   obtaining absolute values of data values acquired for the base slot and the plurality of data slots with respect to each of the touch electrodes included in the region of interest, and then, calculating an average value.

14. A touch sensing device comprising:
- a touch sensing circuit configured to identify touch coordinates on the basis of sensing values for a plurality of touch electrodes which are disposed in a first direction and a second direction, which is perpendicular to the first direction,
- wherein, when a driving signal comprising a base slot and a plurality of data slots, is supplied to the plurality of touch electrodes, the touch sensing circuit determines a position of a pen on the basis of data included in the base slot of the driving signal and updates a position of the pen by acquiring data values for the base slot and the plurality of data slots with respect to each of touch electrodes in a region of interest including the determined position of the pen.

15. The touch sensing device according to claim 14, wherein the touch sensing circuit sets, as the region of interest, a quadrangular region comprising N (N is a natural number) touch electrodes in the first direction and M (M is a natural number) touch electrodes in the second direction around a touch electrode corresponding to the determined position of the pen.

* * * * *